United States Patent [19]
Benton et al.

[11] Patent Number: 5,122,950
[45] Date of Patent: Jun. 16, 1992

[54] METHOD OF AND SYSTEM FOR ELECTRONIC FUNDS TRANSFER VIA FACSIMILE MACHINES

[75] Inventors: William M. Benton, Fort Lauderdale; William Mee, Pompano Beach, both of Fla.

[73] Assignee: Moneyfax, Inc., Ft. Lauderdale, Fla.

[21] Appl. No.: 430,449

[22] Filed: Nov. 2, 1989

[51] Int. Cl.⁵ .................. G06F 15/20; G06G 7/52
[52] U.S. Cl. ....................... 364/408; 235/379; 902/5
[58] Field of Search ............... 364/408, 401; 235/379; 902/4, 5, 6, 24, 41

[56] References Cited
U.S. PATENT DOCUMENTS

| | | | |
|---|---|---|---|
| 4,007,355 | 2/1977 | Moreno | 235/61.7 R |
| 4,277,837 | 7/1981 | Stuckert | 364/900 |
| 4,305,059 | 12/1981 | Benton | 340/825.33 |
| 4,341,951 | 7/1982 | Benton | 235/379 |
| 4,454,414 | 6/1984 | Benton | 235/379 |
| 4,625,276 | 11/1986 | Benton | 364/408 |
| 4,799,156 | 1/1989 | Shavit et al. | 364/408 |
| 4,926,325 | 5/1990 | Benton et al. | 364/408 |
| 4,960,981 | 10/1990 | Benton et al. | 364/408 |

Primary Examiner—Dale M. Shaw
Assistant Examiner—Laura Brutman
Attorney, Agent, or Firm—Lowe, Price, LeBlanc & Becker

[57] ABSTRACT

In a system for carrying out finanical transactions via facsimile machines, account customized transaction vouchers are completed by at least one party to a transaction. The transaction vouchers issued to that party contain thereon a series of pseudo random alphanumeric characters with a different set of characters on each voucher. The party transmits by facsimile an image of the completed voucher to a facsimile machine at a central facility. A character reader at the central facility reads the incoming data and authorizes the requested transaction based on the pseudo random alphanumeric set of characters on the voucher when confirmed by a comparision to a list of pseudo random alphanumeric sets of characters in the account record of that party. Used sets of alphanumeric characters are deleted from the list in the account data to permit onetime usage of a voucher. A credit voucher is sent from the central facility to a facsimile machine at the site of the other party to the transaction. This voucher includes a pseudo random alphanumeric set of characters selected from a second list of such characters in the account information of said second party in the central facility.

18 Claims, 12 Drawing Sheets

Fig. 2

*MONEYFAX PAYMENT VOUCHER*

Membership # 000 000 0000 0

Pay To The Order of: P I N O F R A N C I N I

Name of Moneyfax Member "Payee"

4 1 5 7 0 3 8 1 4 7

4 1 5 7 0 3 8 1 4 7

Moneyfax "Payee" Account Number (Please enter number in duplicate)

6 0 5 1 2 8

MEMO DATA: Invoice, P.O., "Application of Funds" Number    Priority

Date: 0 7 1 2 8 9

0 0 0 0 0 0

0 0 0 0 0 0

(Please enter Amount in Duplicate)

"Currency" 0 1

Area For Bank Name

Signature

PIN 4 2 2 4      PIN 4 2 2 4

Fig. 6g

METHOD OF AND SYSTEM FOR ELECTRONIC FUNDS TRANSFER VIA FACSIMILE MACHINES

TECHNICAL FIELD

This invention relates generally to electronic funds transfer systems and more particularly to a funds transfer system using facsimile machines to transfer electronic funds data of buyers and sellers with a unique high level of transaction security.

BACKGROUND ART

Spurred by the pressures of paper-based checking which is costly and time consuming for financial institutions, various electronic and computer based arrangements have been suggested and used in an attempt to perfect electronic funds transfer. Examples of electronic funds transfer techniques that have achieved substantial usage in recent years are the Automated Clearing House (ACH), Automated Teller Machine (ATM), and point of sale system (POS).

To eliminate the presence of a central computer in every transaction, there has been a trend toward off-line electronic funds transfer, that is, transfer of data between portable and resident units, with only periodic downloading of data to a central computer. Mareno U.S. Pat. No. 4,007,355 and Stuckert U.S. Pat. No. 4,277,837 illustrate two examples of such systems. However both systems present problems that have limited their widespread use. In Mareno, no exchange of funds may be made arbitrarily because the cards carried by each user, although having funds data storage capability, have no keyboards and require a special interface apparatus to be present at each transaction. In Stuckert, cards used with the portable terminals have no display; a separate portable terminal must be involved during each transaction. The user cannot continuously monitor his account, limiting the versatility of the system.

These problems and others were solved by Benton in U.S. Pat. No. 4,305,059 issued on Dec. 8, 1981, disclosing a modular funds transfer system wherein each user as well as vendor carries an identical portable module having a keyboard and a display. Funds are transferred between modules using a hard wire interface, and the account status stored in each module is updated following each transaction. In another patent to Benton U.S. Pat. No. 4,341,951, printed vouchers are issued by the portable module following each transaction.

The Benton approach was further refined in U.S. Pat. No. 4,454,414 to provide bidirectional optical coupling between portable funds data transfer modules, including a "hand-shaking" protocol that enables funds transfer to be completed only if a number of criteria are satisfied. These criteria include an identification check following keyboard entry by the user of a secret number and examination of the transaction amount to ensure that it falls within credit limits. In Benton et al. U.S. Pat. No. 4,625,276, electronic funds data are transferred between portable modules either directly in a local mode of operation or indirectly, via telephone lines, in a remote mode of operation. Transaction records are printed by an outboard printer or downloaded to a central computer.

The systems described in the aforementioned Benton et al. patents are capable of having a substantial impact on the manner by which financial transactions are carried out, securely transferring funds between buyers and sellers while simultaneously printing supporting documents. However, considerable dedicated apparatus including a modem and printer as well as portable modules are required to implement these systems. In copending application Ser .No. 236,614 to Benton et al., filed Aug. 23, 1988 now U.S. Pat. No. 4,926,325, there is described a modification to and implementation of a conventional facsimile machine to be operative in a transaction mode of operation for carrying out transactions between buyers and sellers.

While generally satisfactory, this Benton et al. system requires modification of existing facsimile machines to interface with the integrated circuit memory modules carried by authorized users. System implementation would be substantially simplified if electronic funds transfer could be carried out through conventional, unmodified facsimile machines. It would also be preferable to clear transactions at the ACH in real time, on line, in a manner consistent with existing funds transfer protocols. Such a system is described in Benton copending application Ser. No. 298,348, filed Jan. 17, 1989 now U.S. Pat. No. 4,960,981.

The Benton system in the '348 application provides a method and system for carrying out electronic funds transfer in real time, via conventional, unmodified facsimile machines using existing electronic funds transfer protocol. In accordance with one aspect of that system facsimile machines located at the sites of the parties to a transaction, e.g., buyer and seller may transmit the contents of a document in bit mapped form to a facsimile machine located at or near a central facility such as an automated clearing house (ACH). The system includes special transaction vouchers to be sent by facsimile by the buyer and seller to the ACH for clearing. Each voucher has particular regions containing pre-printed information and other regions to be filled in for each transaction including the amount of the transaction. A character reader associated with the facsimile machine at or near the ACH reads the various regions of the images of the transaction vouchers received by facsimile, formats the images into data recognizable by the ACH and supplies the data to the ACH for transaction clearing.

The ACH stores personal identification numbers (PINs) of parties authorized to carry out financial transactions and compares the personal identification number provided by each party with the stored personal identification numbers to determine whether the parties are authorized to transact within the system. Also stored are account data associated with parties authorized to carry out financial transactions. The ACH compares the amount of each requested transaction with the stored account data to determined whether a requested transaction is authorized.

The ACH sends to the parties, via facsimile, printed reports providing transaction summaries. A first report, following confirmation by the parties that a requested transaction should be carried out, summarizes the details of the pending transaction. Another report is sent to the parties that in effect is a hard copy invoice of the transaction. From time to time, the ACH also sends by facsimile to all authorized users of the system a summary of their account activity.

Other features of the electronic fund transfer system of the '348 application are described in detail in that application which is incorporated herein by reference.

SUMMARY OF THE INVENTION

In any system of funds transfer security is of paramount importance and this is particularly true with electronic funds transfer.

It is accordingly an object of this invention to provide a method and system for carrying out electronic funds transfer with a degree of security believed to exceed that available in using traditional checks.

It is another object of the invention to provide a secure method and system for electronic funds transfer that entails virtually no additional effort by the system users.

It is still another object of the invention to provide such a secure method and system for electronic funds transfer that incorporates a unique safeguard to either or both parties to the transaction.

The invention may be briefly described in the content of an electronic funds transfer system of the type described in the aforementioned '348 application. According to the invention the transaction vouchers in each book of one time use vouchers have printed on their face a string of pseudo-random alphanumeric characters. Along with each book there is provided a machine readable list of the strings of characters on the vouchers which are bound in the voucher book. Each string is randomly different. This list of character strings is transferred by facsimile to the ACH by the bank when a new money facsimile transfer account is opened and/or new vouchers are ordered. The random voucher character strings are entered in the new members file (Member Master File). The account is now activated and the voucher strings or numbers are "valid". No voucher can be used until it is resident in and appropriately activated in the Member Master File. When a voucher is used, that voucher's unique number is then deleted from the file and can never be used again. Truncated vouchers or copies of such are of no value.

The customer chosen PIN is entered on the voucher twice to assure reliability. The PIN is then transmitted by facsimile with all of the data elements contained on the voucher. The PIN is preferably carried on a PIN strip removably attached to the voucher. The PIN strip is removed after the facsimile transmission and subsequently destroyed. This is also a visual reminder that this voucher has been used and is now truncated. The usual comparison of the PIN at host computer level represents a significant reduction in risk.

The new security system provides multiple fraud prevention features and is believed to offer an electronic fund transfer system having a degree of security which exceeds that which is inherent in the traditional check system. Other objects and advantages of the invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature and not as restrictive.

BEST MODE FOR CARRYING OUT THE INVENTION

Figure 1:
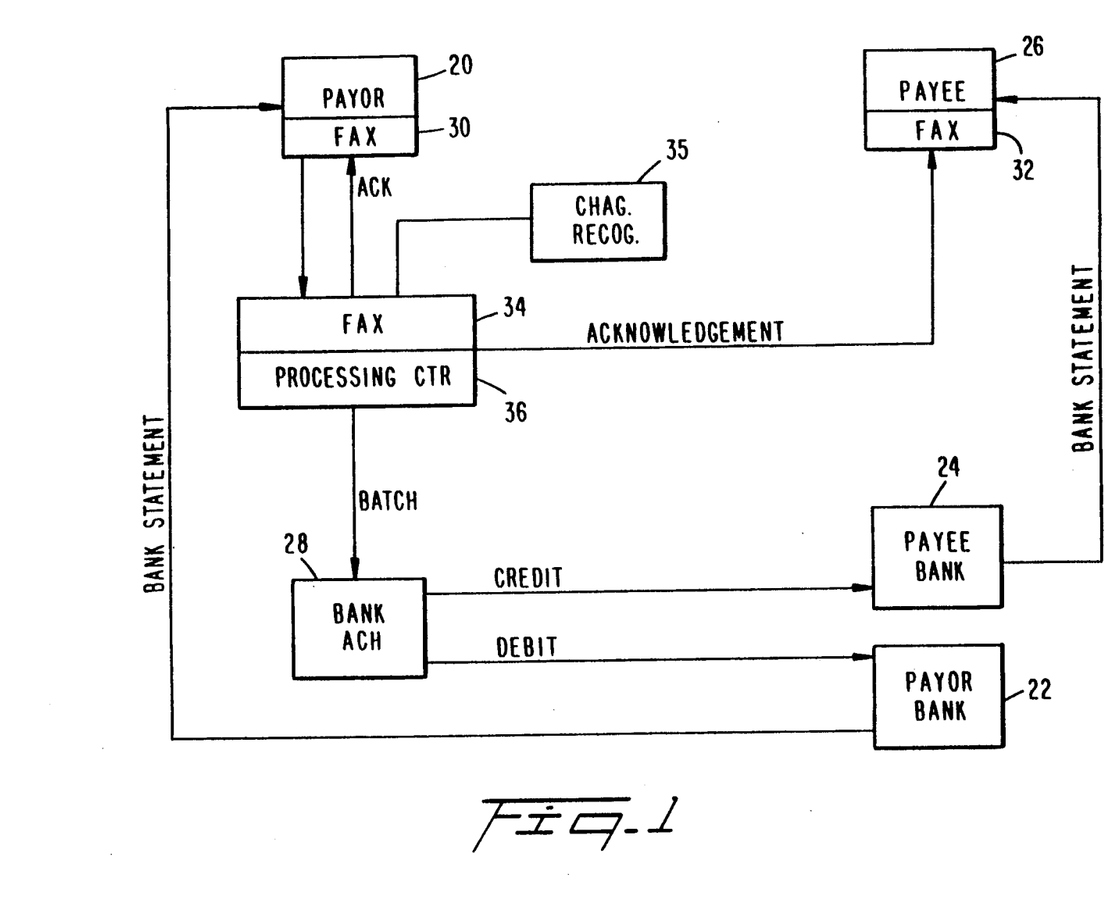
FIG. 1 is a block diagram showing on-line electronic funds transfer with ACH clearing incorporating the general system with which the security features of the invention may be utilized.

Referring to FIG. 1, as an overview of funds transfer between parties in an automated clearing house (ACH) network, a payor 20 will transfer funds from an account in his bank 22 to the account of a payee 26 in payee's bank 24. As an intermediary between the banks 22 and 24 there is an automated clearing house (ACH) 28, which is an association of banks arranged to carry paperless exchanges including posting and clearing transactions, such as direct deposits, preauthorized bill payments, customer initiated entries, corporate transfers and the like. This type of network, being well known in the art since 1972, is not described in further detail herein. The invention to be described in detail hereinafter implements electronic funds transfer using remote facsimile machines 30, 32 at the sites of the payor 20 and payee 26 to transmit images of special transaction vouchers to a local facsimile machine 34 at a central facility 36 preferably at or near the ACH 28.

The central facility 36 uses conventional character recognition equipment 35 to separate text from the incoming voucher image and to encode the text into the proper protocol for processing by the ACH 28. The ACH 28 in turn determines whether the parties are authorized to carry out the transaction, depending upon transmission to the ACH by the parties of correct identification data, and upon confirmation of an adequate balance in the payor's account to support the transfer of funds requested. Of particular importance, written transaction receipts or summaries are sent by the ACH to the parties for confirmation via facsimile.

Facsimiles 30, 32 and 34 are conventional machines capable of CCITT, group III or greater, image transmission. Such facsimile machines, being well known, are not described in detail herein. However, it is helpful, by way of review, to note that conventionally a facsimile machine contains all the necessary electronic capability to function as a "front-end" processor for a centralized automated computation and clearing network as required by the present invention. This capability includes a printer to generate hard copy printout, a document reader having an optical scanner to optically digitize documentary material, a modem to transfer to a communication medium such as telephone lines, binary data at a high baud rate, and a telephone line interface including a dialer to generate DTMF dialing tones and process voice communications. It is important to note, that rather than transmitting the ASCII character representation of documentary material, facsimile machines send the actual document image as a binary encoded, "bit mapped" stream of data. The character recognition equipment 35 at the central facility 36 utilizes a computational algorithm to recognize and reconstruct the textual content of digitized image data, in a manner that is well known to persons skilled in the art.

Figure 2:
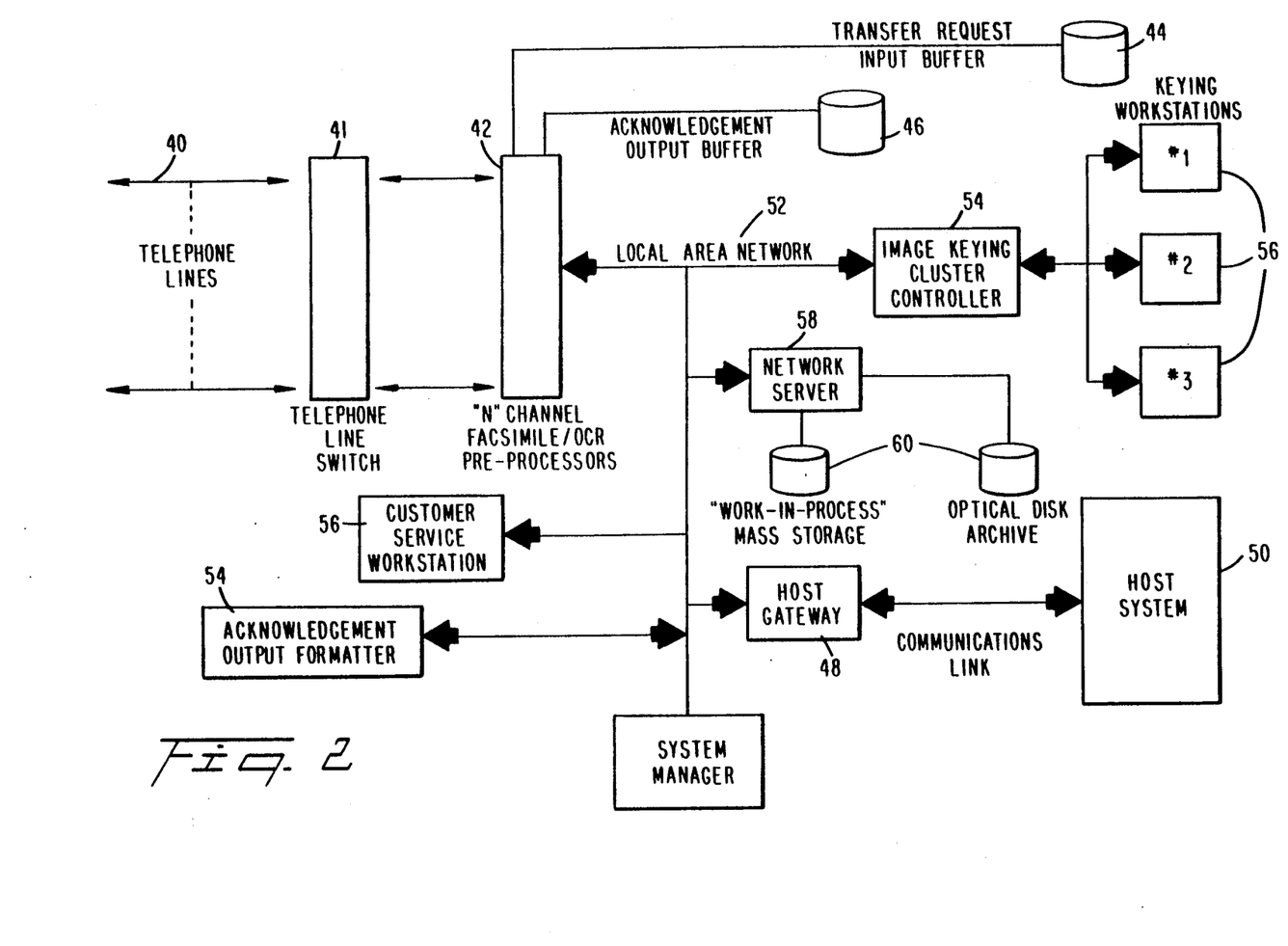
FIG. 2 is a block diagram showing a central image processing system.

Referring to FIG. 2, a plurality of dual-mode telephone lines 40, for example forty lines, and a conventional line switch 41 handle incoming and outgoing communications at the central image processing system. As described, the information is received by a facsimile terminal and certain fields from the voucher undergo an Optical Character Recognition (OCR) process so that key information such as account numbers are automatically known. These steps are performed by a number of Facsimile/OCR Preprocessors 42 which serve as the linkage between telephone lines 40 and the systems electronic communications network. For monitoring and back-up purposes, all of the activity going through the preprocessors 42 are stored on the transfer request input buffer 44 and the acknowledgement output buffer 46.

Typically information from the preprocessors is transmitted to the host gateway 48, which then communicates this information to the host computer system 50 of the financial services organization offering the Facsimile Funds Transfer (FFT) service. The FFT system would then receive notification back from the host computer system as to whether a requested FFT transaction was approved. The host system may be incorporated in the bank ACH 28 of FIG. 1.

There will be a limited number of instances in which FFT requests must first receive human intervention. Requests will be handled by operators on an exception basis—usually when the system senses that a request is unclear or not legitimate. In such cases, information concerning a request would then be transmitted via the systems ethernet network 52 to the image keying cluster controller 54. This controller assigns a specific FFT request to an image keying work station 56. Once an operator at a work station receives a requested transaction the operator goes through a set procedure of verifying and cross-checking the information. In the illustration in FIG. 2 there are three image keying work stations and the average time for a transaction may be less than 15 seconds depending on the amount of information to be keyed. Once a transaction has been approved by an operator at an image keying workstation, the imaging keying cluster controller 54 transmits the necessary information over the network to the host gateway in the same manner followed by requests not routed to image keying workstations.

The response from the host computer system/ACH will indicate whether the request has been approved and will contain certain authorization and support data. This information is then sent over the network to the acknowledgement output formatter 54. Here two facsimile transmissions are prepared. One is a facsimile funds transfer FFT credit voucher that will inform a party that he has received an FFT payment into his account. The second is a transaction confirmation that is sent back to the account that initiated the FFT transaction. Both of these transmissions are then sent over the network to an available pre-processor, which accesses a telephone line and performs the actual facsimile transmission. A customer service workstation 56 permits an operator to handle any administrative and adjustment activities. The network server 58 archives all facsimile information that is received and transmitted on either its magnetic or optical disc memory storage units 60. The system may be staffed by 4-5 employees during peak hours with an off hours staffing of 1-2 persons. The system is designed for simple operation whereby it is possible to utilize low skill level operators.

Figure 3:
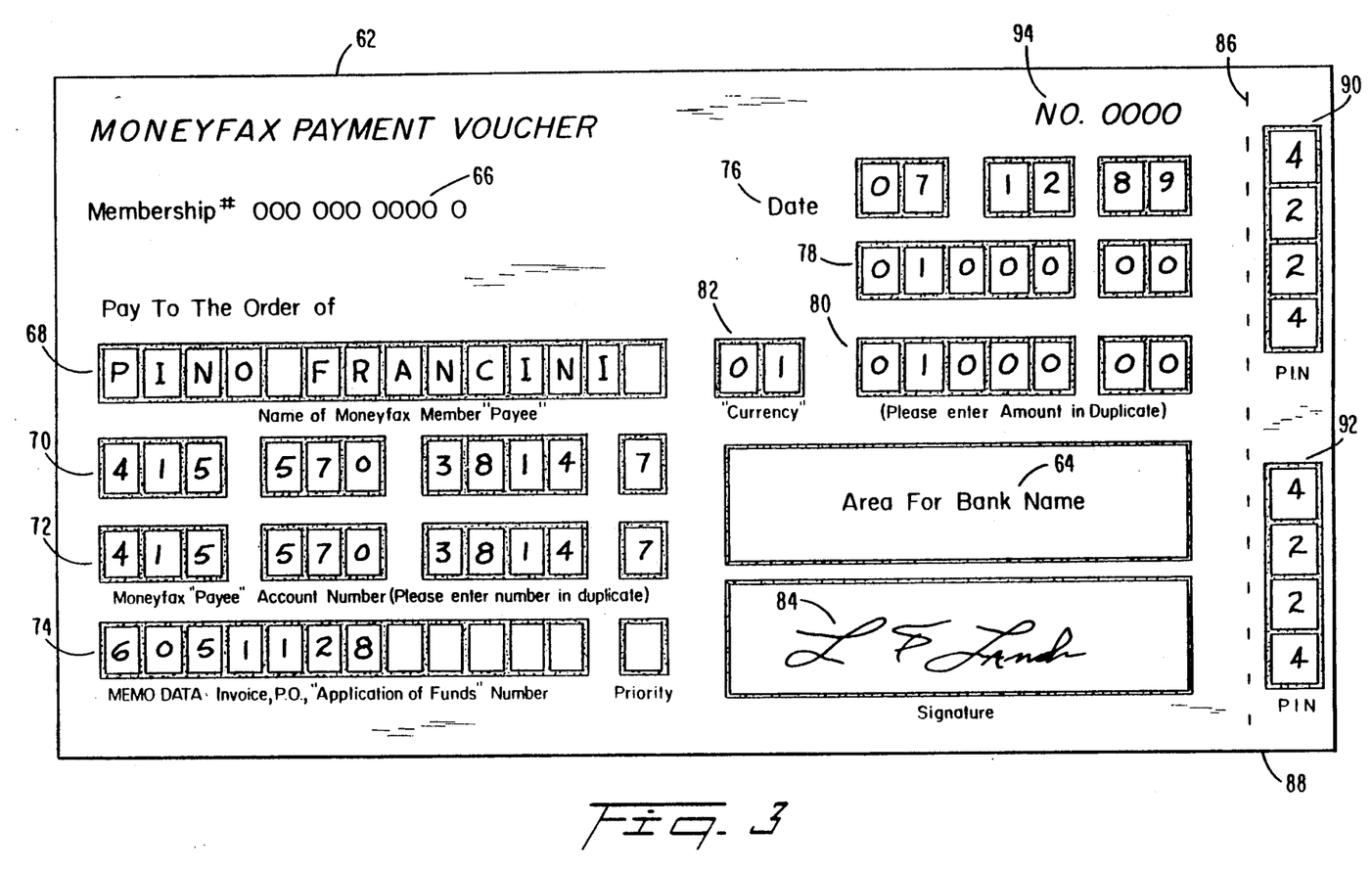
FIG. 3 is a diagram of one embodiment of a transaction voucher used in the system of this invention and filled out by the payor to a transaction.

Referring to FIG. 3 there is shown a sample of a specially drafted transaction voucher 62 which contains in a machine readable format the complete set of information necessary to characterize and clear a transaction. The transaction voucher 62 is customized and preprinted for an individual account and bank and would have an issuing bank name at the area for bank name 64. Similarly a specific and unique membership number would be imprinted upon the voucher at 66. The voucher has a field 68 for receiving by hand written entry the name of the payee, a field 70 and field 72 for redundant entry of the account number of the FFT payee, and a field 74 for entry of an application of funds number. A field 76 receives the handwritten date, while fields 78 and 80 receive a redundant and duplicate handwritten entry of the amount of the transaction. Field 82 is utilized to designate the currency. Field 84 receives the handwritten signature of the party to the transaction. At the right edge of the voucher and attached by perforations 86 is a removable PIN tab 88. The tab 88 contains fields 90 and 92 to receive a redundant duplicate handwritten PIN entry. The tab is removable preventing reuse of the voucher.

A key element of the security system of this invention involves on each voucher a field 94 wherein there is printed on a per voucher basis a unique finite (100 element, for example) collection of pseudo randomly selected 6 or more alpha numeric digits or characters. This series of singular and unique digits is assigned to a members file and at the same time preprinted on the set of vouchers issued to the member. As these are used, the numbers are flagged from the master file. The transmitted voucher number must match the current sequential number in the members master file. The payee's file also contains a similar preselected list. These numbers are assigned to the credit memo voucher transmitted to the payee. The payee then may verify that the credit memo voucher number corresponds to the pre-printed list included in the back of his voucher booklet. This prevents fraudulent sending of funds availability notification to a payee.

Figure 4:
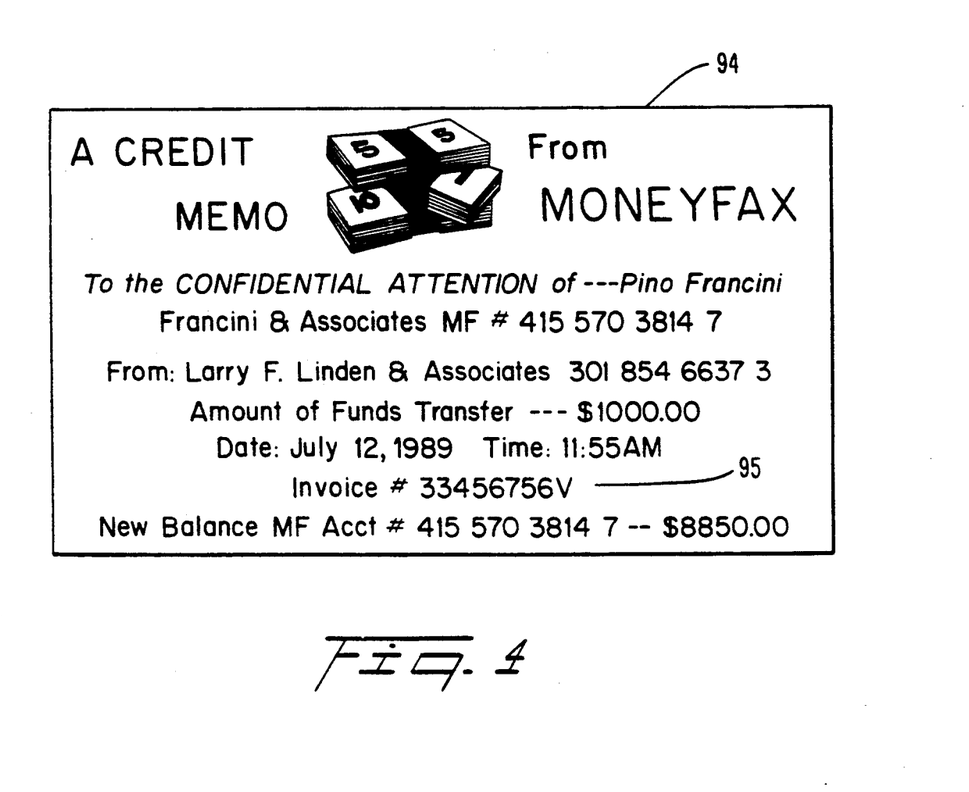
FIG. 4 is diagram of a credit memo according to the invention.

Turning to FIG. 4 there is shown a sample confirmation credit memo voucher 94 which is transmitted to the payee by the FFT processing center. Obviously, the conformation credit memo voucher must be credible as a bonafide document. The ability to transmit a fraudulent credit memo voucher to a seller could result in the fraudulent verification of funds availability and subsequent release of goods or services. To deter this possibility each credit memo to a particular payee (seller) is preferably sequentially numbered from another sequence of pseudo randomly selected alphanumeric digits. Such a random number is shown in the field 95 in the credit memo in FIG. 4. Thus the originator of a fraudulent credit memo would require knowledge of the list of random numbers as well as the prior sequence of credit memos issued to the particular payee. A facility within the FFT processing center is provided to verify funds availability and to certify credit memos via telephone.

Figure 5:
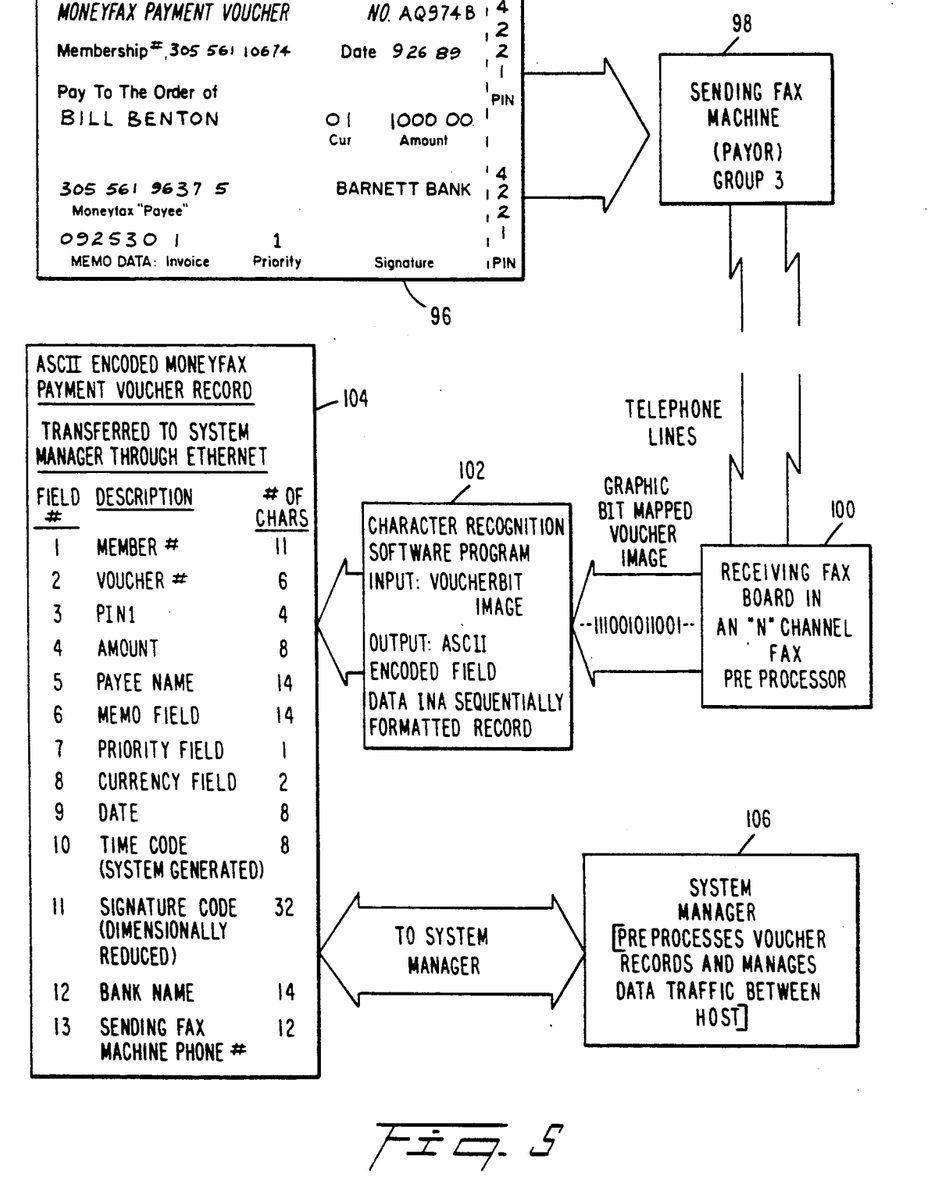
FIG. 5 is a flow chart illustrating the general operation of the system.

A typical data flow utilizing the system of the invention is illustrated in simplified form in FIG. 5. Referring to FIG. 5 a completed FFT payment voucher 96 is transmitted by a sending facsimile machine 98 to a receiving board in an N channel facsimile pre-processor 100. The graphic bit mapped voucher image is transmitted by the pre-processor to the character recognition software program 102 which outputs an ASCII encoded field of data in a sequential formatted record. This ASCII encoded FFT payment voucher record is transferred to the system manager through the ethernet at 104. The systems manager at 106 pre-processes the voucher records and manages the data traffic to and from the host.

Figure 6A:
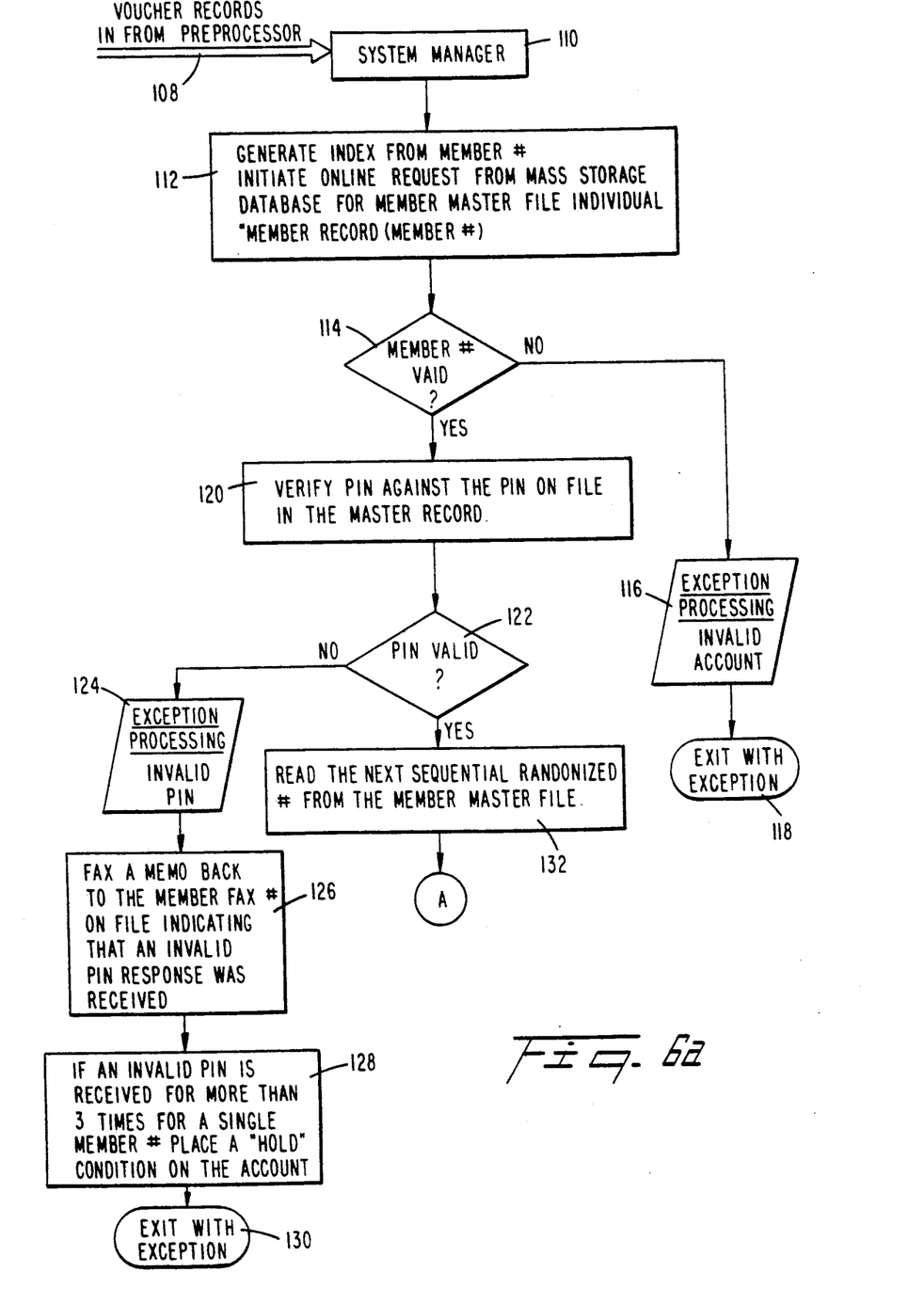
FIGS. 6(a)-6(g) are a flow chart showing programming of the central computer at the ACH for carrying out the principles of the invention.

Operation of the system shown in FIG. 5 is now described with reference to the flow chart set forth in FIGS. 6(a)-(g). Referring to FIG. 6(a) the data from an N channel facsimile/OCR pre-processor produced by a voucher such as voucher 62 in FIG. 3 is inputted at 108 to the system manager 110. An index key is now generated from the membership number to initiate an on-line request from the mass storage data base for the individual member master file record (step 112). A membership validity decision is made at 114. If the member account number cannot be validated, the processing is aborted at 116 and exited with exception at 118 with a report to the payor that the account number in the FFT voucher was unreadable or invalid.

If the membership account number is determined to be valid, the program proceeds to step 120 to verify the PIN against the PIN on file in the master member file record. The PIN validity decision is made at 122. An invalid PIN coupled with a valid account number suggests a possible security problem. The invalid PIN is noted and exception processing commenced at 124. A memo is transmitted by facsimile back to the member facsimile number on file indicating that an invalid PIN response was received (Step 126). If an invalid PIN is received more than three times for a single member number a HOLD is placed on the account (Step 128) and the program exited with exception at 130. If the PIN decision at 122 is valid the next sequential random number from the member master file is read (Step 132).

As previously stated, a pseudo randomly selected list of numbers or characters are sequentially printed on each of the 100 vouchers in the set issued to the member. An identical image of this list is maintained in the member master file. As each voucher is used and its assigned random number is evaluated as being a valid number it is then deleted from the list in its order of usage. Thus a voucher can be used only once and never again. The next voucher to be used must contain the next random number in the sequence or else it will be rejected as invalid. The probability of fraudulent guessing of the next number in the list is negligibly small.

Figure 6B:
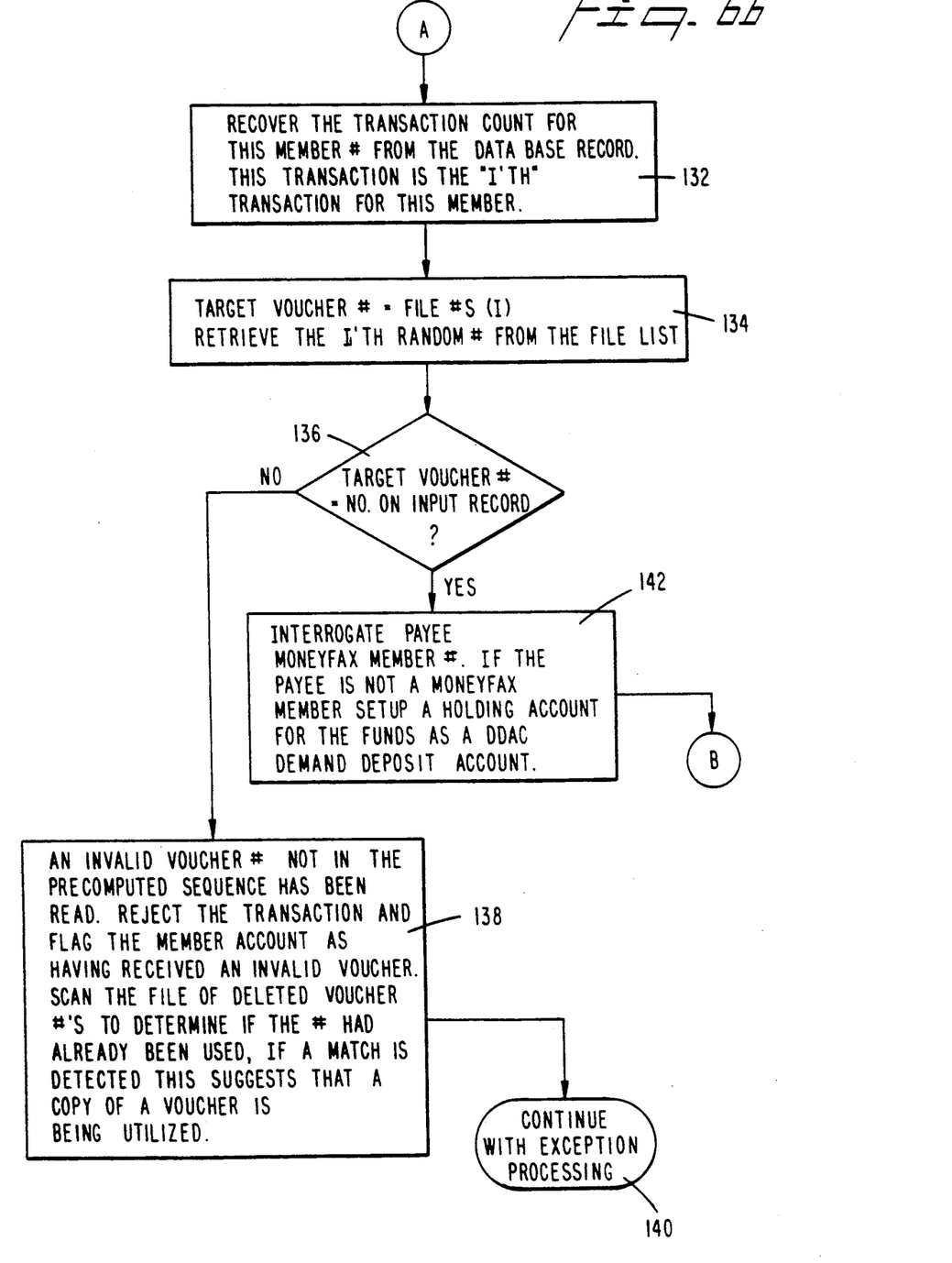

The transaction count for the inputted member number is retrieved from the database record of the member master file (Step 132) FIG. 6(b). The target voucher number is next compared to the number determined by the transaction count retrieval of the random number from the member master file (Step 134). The decision as to the validity of the random number is made at 136. If no correspondence is indicated, i.e. an invalid voucher number is detected, the transaction is rejected and the member account is flagged as having received an invalid voucher. The program next scans the file of deleted voucher numbers to determine if the rejected voucher has already been used. If a match is detected in this search it suggests that a copy of a voucher is being used (Step 138). The program is exited with exception at 140 and an account investigation undertaken for possible fraud or misuse.

Figure 6C:
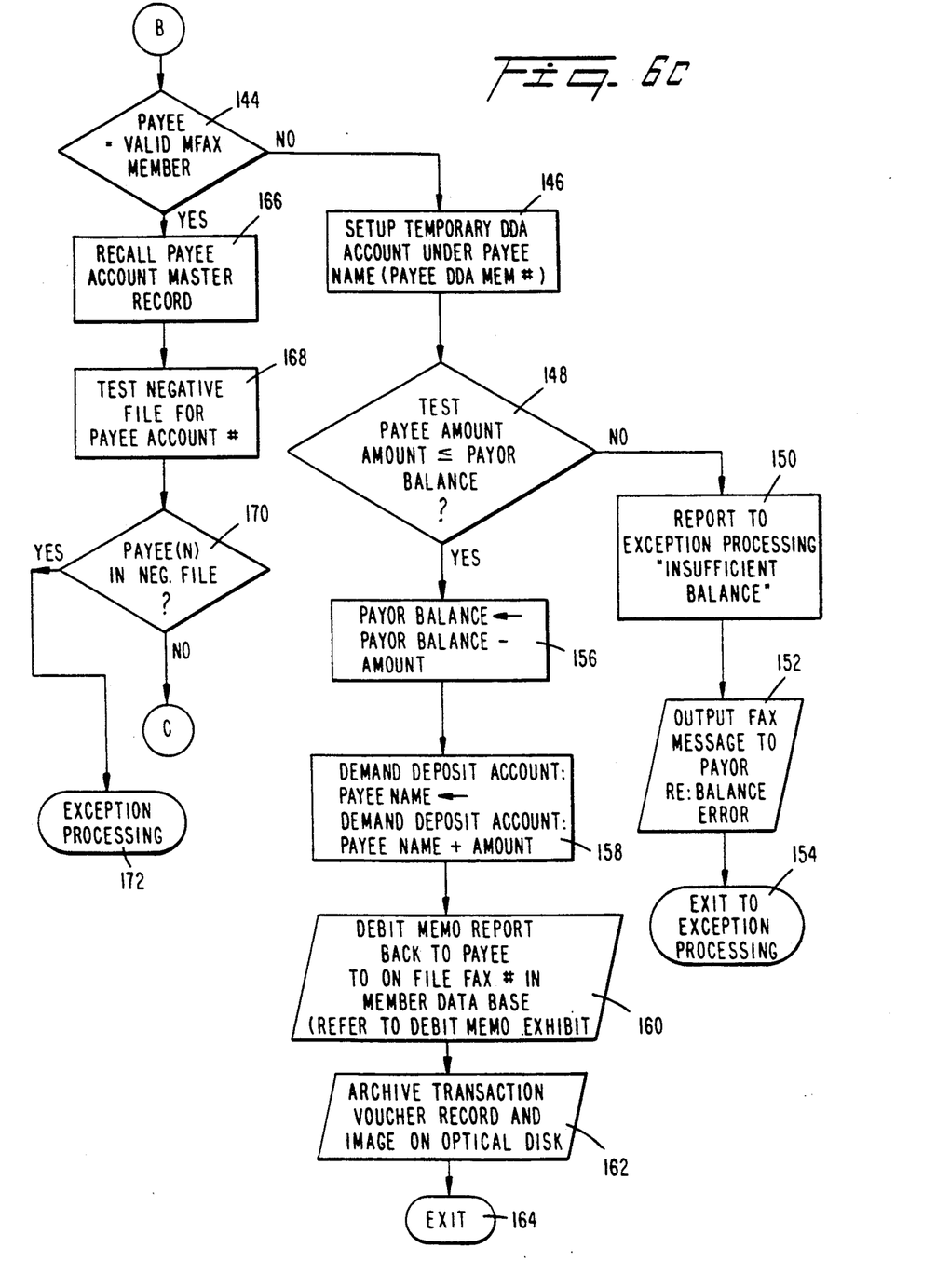

If the random number comparison 136 indicates a match a valid sequence number has been obtained. The program next proceeds to interrogate the payee FFT number to determine whether the payee is an FFT member. IF the payee is not a member of the FFT service a holding account for the involved funds is set up as a demand deposit account of the payee (Step 142). This decision is shown in FIG. 6(c) at 144. The set up of a temporary demand deposit account under the name of the payee is indicated at 146. The program next tests whether the payor balance is sufficient to cover the payee amount (Step 148). If the determination is negative an insufficient balance report is made to exception processing (Step 150). An output facsimile message is initiated to the payor (Step 152) and the program exited to exception processing at 154.

If the decision at step 148 is affirmative and indicates that the payee amount is equal to or less than the payor balance, the balance is determined at 156 and the demand deposit account in the payee name for the payee amount is established at 158. A credit memo report to the payee at a payee facsimile number appearing in the member master file is initiated (Step 160), the transaction is then archived in a voucher record, and imaged on the optical disc (Step 162). The program is exited at 164.

Returning to the payee member number validity decision at step 144, if the decision is affirmative to indicate that the payee member number is valid, the program next recalls the payee account master record (step 166). The payee account number is next tested against the negative file compilation (Step 168). If this decision (Step 170) is affirmative to indicate an attempt to transfer funds to a negative account the transaction is aborted and exited with exception at 172. The exception operator is flagged and will call the payors listed contact number.

Figure 6D:
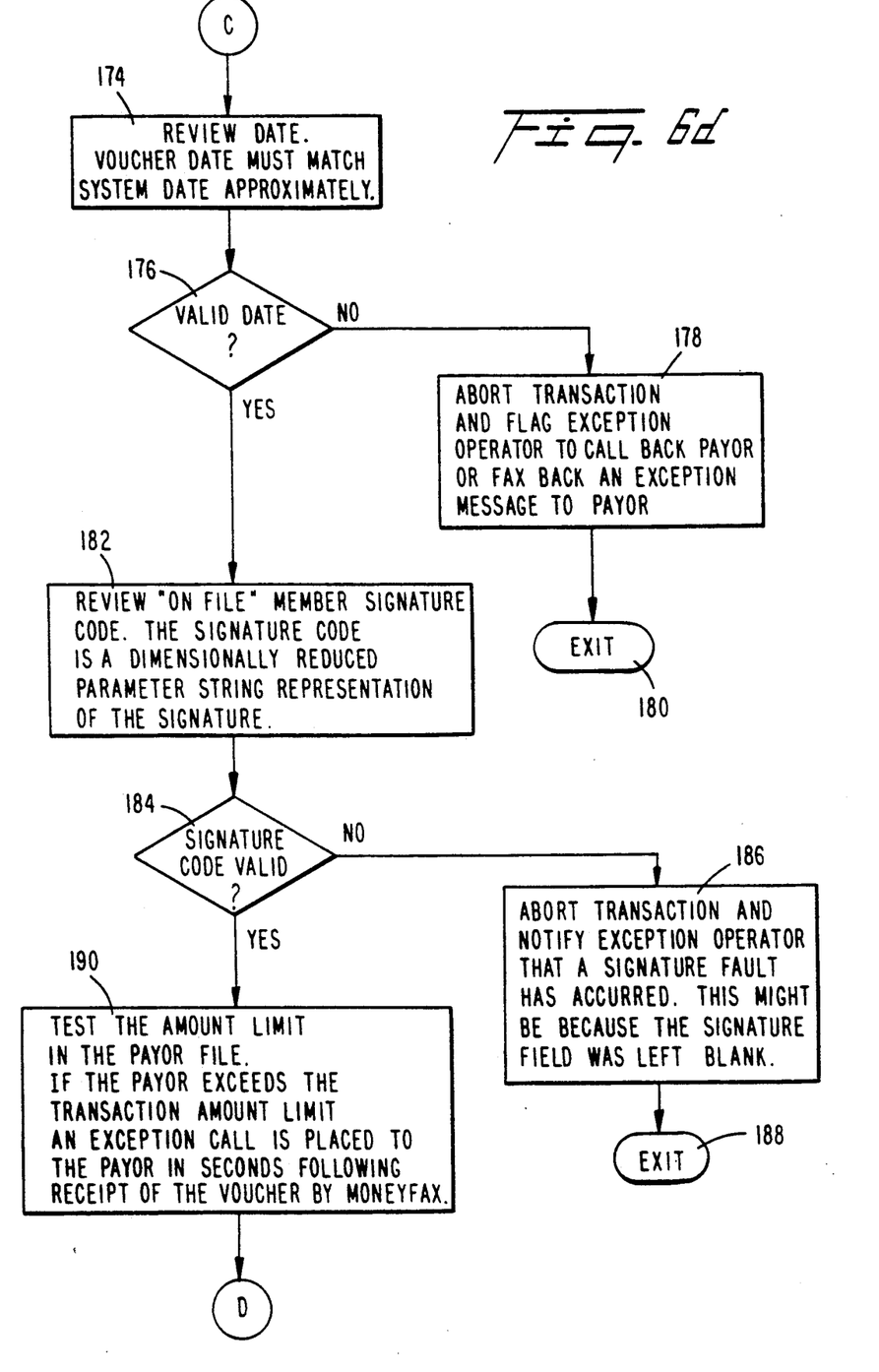

If the payee account number is not in the negative account file as determined at 170, the program next reviews the actual date against the voucher date for approximate coincidence (Step 174) FIG. 6(d). The validity of the date decision is made at 176. If the difference between dates exceeds the predetermined programed limit, the transaction is aborted at 178. The exception operator is flagged to call back the payor or to facsimile back an exception message to the payor and the program is exited at 180.

If the date is valid or within the programmed difference, the program next reviews the on file member signature code. This comprises a dimensionally reduced parameter string representation of the signature (Step 182). The decision as to the validity is made at 184. If the signature cannot be validated the transaction is aborted at 186. The exception operator is flagged that a signature fault has occurred. This could be because the signature field was left blank. The program is exited with exception at 188. If the signature comparison results in an affirmative answer, thereby validating the signature, the program next tests the amount limit in the payor file (Step 190). If the amount in the transaction voucher exceeds the transaction amount limit an exception is flagged and a call is made to the payor immediately following receipt of the voucher by the FFT service.

Figure 6E:
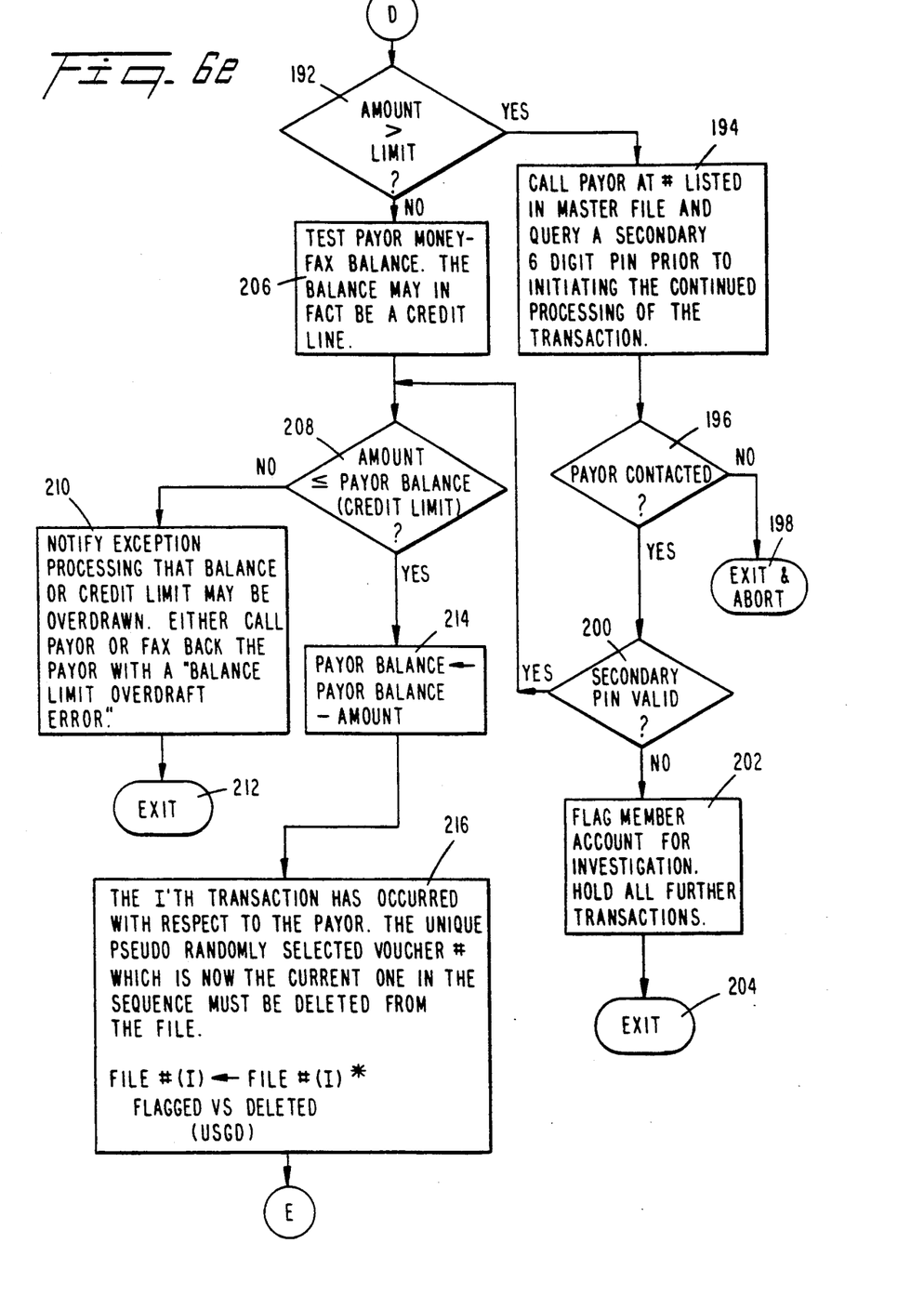

The amount limit decision is made at 192 in FIG. 6(e). As stated, if the amount limit is exceeded, the payor is called at the number listed in the member master file. A query is then made of a secondary six digit PIN prior to continuing with processing of the transaction (Step 194). If the payor cannot be contacted, the program is exited and aborted (Step 196–198). If the payor is contacted (Step 196) a decision as to the validity of the second PIN is made at 200. If the decision is negative and the second PIN is not validated, the member account is flagged for investigation with a HOLD of all further transactions at 202 and the program is exited at 204. If the second PIN validation inquiry at 200 is answered affirmatively, the program proceeds to a further inquiry at step 208 presently to be described.

Returning to the amount limit decision at 192 and to the situation wherein the inquiry is answered negatively and it is determined that the transaction amount does not exceed the amount limit, it is recognized that the balance may in fact be a credit line (Step 206). An inquiry as to whether the transaction amount is less than or equal to the payor balance including the credit limit is made at 208. If the transaction amount is not less than (exceeds) the payor balance (credit limit), exception processing is flagged at 210 to indicate that the balance or credit limit may be overdrawn. The payor is either called if such a service is indicated in the payors member master file or there is a facsimile communication back to the payor with an indication that there has been a balance limit overdraft error. The program is exited at 212.

If the decision at 208 indicates that the amount of the transaction is less than the payor balance (credit limit) the payor balance is debited at 214. The program next notes the use of the pseudo randomly selected voucher number involved in the transaction and flags that number as used or deleted (Step 216).

Figure 6F:
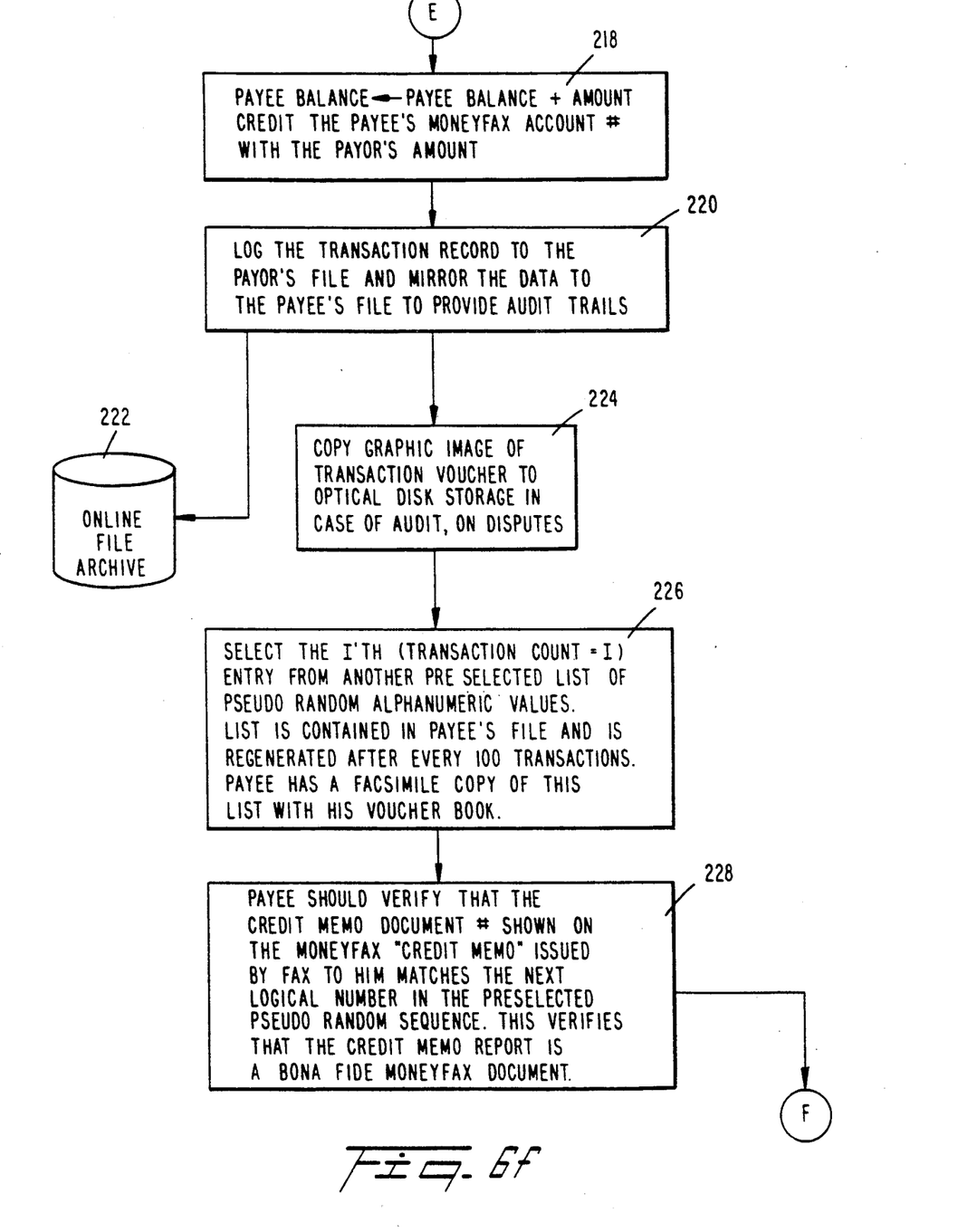

Referring to FIG. 6(f), the payees FFT service account number is credited with the transaction amount (Step 218). The transaction is logged to the payors master member file and the data is mirrored to the payees master member file to provide audit trails (Step 220). The data is archived at 222. A copy of the graphic image of the transaction voucher is forwarded to the optical disc storage for purposes of audit or dispute (Step 224).

As explained previously, the payee may be provided with a list of pseudo random alphanumeric characters or credit memo digits corresponding to the number of his transactions with this specific payor. The same list appears in the data in the payees master member file. The program now selects the next pseudo random alphanumeric set of characters from the payees credit memo file list (Step 226). This number is known to the payee by reference to his corresponding list and his knowledge of the number of transactions with this payor which have transpired previously, e.g., he knows the number of this transaction. The payee then verifies that the credit memo document number shown on the FFT credit memo issued by facsimile to him (such as the memo of FIG. 4) matches the next sequential number in the preselected pseudo random sequence. This verifies that the credit memo report is indeed a bonafide FFT service document (Step 228).

Figure 6G:
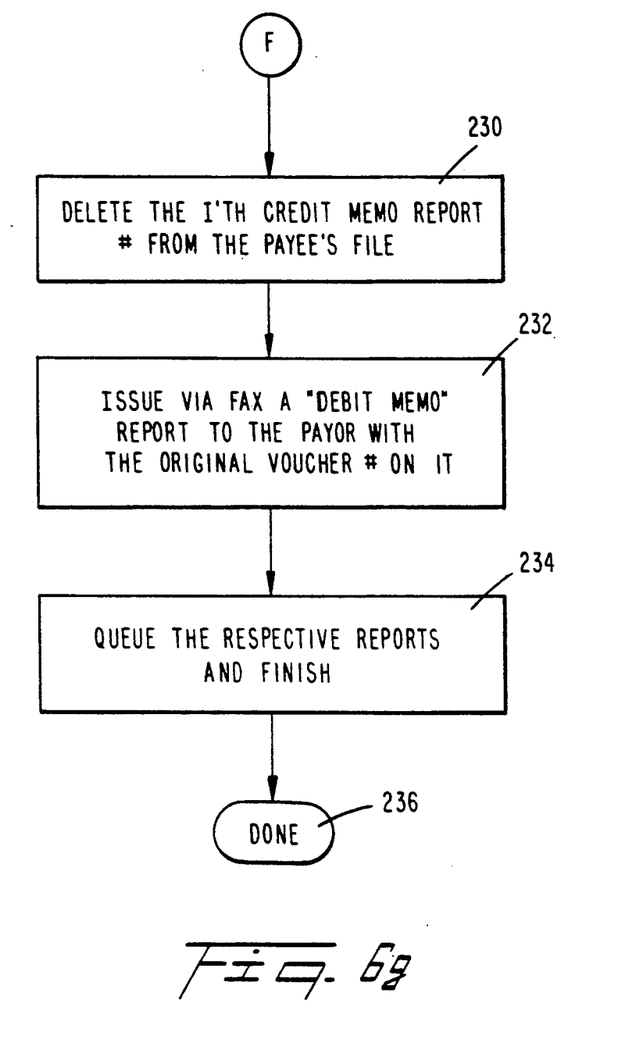

Referring to FIG. 6(g), the program next deletes the credit memo report number form the payees file list of pseudo random credit memo numbers (Step 230). A debit memo is then issued via facsimile to the payor with the original voucher number (Step 232). The respective reports are queued and the program is finished (Step 234 and 236).

Conclusion

There has been described a method and system for transferring funds, on-line, between accounts using facsimile machines that are conventional and unmodified. This is accomplished according to the invention with a degree of security which exceeds that available in the conventional use of checks. This is made possible by special vouchers containing account numbers for payor and payee, a PIN number, a signature, and most particularly a pseudo-randomly selected alphanumeric serial number known only to the payor and stored in machine language in the transacting institution. In like fashion, the payee is provided with a credit memo possessing a similar measure of security. Thus the credit memo contains the member account numbers of the payor and payee in addition to a second pseudo random alphanumeric serial number known only to the payee and stored in the data bank of the transacting institution. Thus the payee also has his own unique protection against the issuance of fraudulent credit memos.

In this disclosure there is shown and described only the preferred embodiment of the invention it being understood that the invention is capable of use in various other combinations and environments and is capable of changes or modifications within the scope of the inventive concept as expressed herein.

What is claimed is:

1. An electronic funds transfer system for carrying out financial transactions between parties to a transaction, comprising:
    at least one remote facsimile machine at the site or sites of the parties to the transaction;
    a central facsimile machine located at a central facility for receiving incoming images sent from said at least one remote facsimile machine at the site or sites of said parties;
    a central computer means associated with said central facility and means for formatting said incoming images into a form recognizable by said central computer means;
    a transaction voucher having a region for containing at least the amount of a transaction, an account number, and a pseudo random alphanumeric set of characters;
    images of transaction vouchers sent by the at least one remote facsimile machine to said central facsimile machine being formatted and processed by said central computer means; and
    means incorporated in the central computer means for clearing the transaction based upon the image of said pseudo random alphanumeric characters received from said at least one remote facsimile machine.

2. A funds transfer system according to claim 1 wherein said means incorporated in the central computer means includes a list of the pseudo random alphanumeric characters carried by a set of transaction vouchers issued to a funds transfer account holder; and
    means for comparing a predetermined set of said alphanumeric characters in said list with the alphanumeric characters in the image of said transaction voucher.

3. A funds transfer system according to claim 2 wherein said central computer means has stored therein a second list of pseudo random alphanumeric characters assigned to a second funds transfer account holder; said central computer means, upon the clearing of a transaction based upon the first named pseudo random alphanumeric characters, controlling said central facsimile machine to transmit to a remote facsimile machine at the site or sites of the parties to the transaction a confirmation voucher including a predetermined set of alphanumeric characters from said second list of pseudo random alphanumeric characters.

4. A funds transfer system according to claim 3 including means to delete or void the alphanumeric character is said list after matching with said image to clear a transaction.

5. A funds transfer system according to claim 1 wherein said transaction voucher includes a region receiving the signature of the maker of said transaction voucher; and having a region including at least one personal identification number (PIN);
- said region of said voucher receiving said PIN being detachably attached to the remainder of said voucher to permit removal of said PIN region from the remainder of said voucher after the image of said transaction voucher is sent to said central facsimile machine to prevent reuse of said voucher;
- said transaction voucher being issued to an electronic funds transfer system account holder having an account file stored in said central computer means, said account file for said member including an account number and signature data and said PIN in addition to said list of pseudo random alphanumeric characters;
- a transaction being cleared for said member by matching said pseudo random characters on the voucher image as well as by matching said account number and signature data and PIN with the voucher image.

6. An electronic funds transfer system for carrying out financial transactions between parties to a transaction, comprising:
- at least one remote facsimile machine at the site or sites of the parties to the transaction;
- a central facsimile machine located at a central facility for receiving incoming images sent from said at least one remote facsimile machine at the site or sites of said parties;
- a central computer means associated with said central facility and means for formatting said incoming images into a form recognizable by said central computer means;
- a set of transaction vouchers having corresponding regions thereon carrying different pseudo random alphanumeric characters;
- images of transaction vouchers sent by the at least one remote facsimile machine to said central facsimile machine being formatted and processed by said central computer means; and
- means incorporated in the central computer means for clearing the transaction based upon said incoming voucher images received from said at least one remote facsimile machine;
- said means for clearing including a list of said pseudo random alphanumeric characters;
- said transactions being cleared by matching the pseudo random alphanumeric characters on the voucher image being received with the next pseudo random alphanumeric character sequence in said list.

7. A funds transfer system according to claim 6 wherein said set of vouchers is issued to an electronic funds transfer system account holder having an account file stored in said central computer means, said account file including an account number and signature data for said member in addition to said list of pseudo random alphanumeric characters; a transaction being cleared for said member by matching said pseudo random characters on the voucher image as well as by matching said account number and signature data with the voucher image.

8. A funds transfer system according to claim 6 wherein said set of vouchers includes removable personal identification numbers (PIN); said transaction clearance including matching said PIN to a PIN stored in said account file; said PIN being removed from a used voucher to prevent reuse thereof.

9. In an electronic funds transfer system for carrying out financial transactions between parties to a transaction, comprising:
- at least one remote facsimile machine at the site or sites of the parties to the transaction; a central facsimile machine located at a central facility for receiving incoming images sent from said at least one remote facsimile machine at the site or sites of the said parties and for transmitting document images to at least one remote facsimile machine;
- a central computer means associated with said central facility and means for formatting said incoming images into a form recognizable by said central computer means and for formatting said outgoing transmissions into a form graphically reproducible by said at least one remote facsimile machine;
- means associated with said central computer means associated with said central facility storing a pseudo random sequence of alphanumeric characters associated with at least one transacting party;
- a transaction voucher having a first region for containing at least the amount of a transaction, an account number and the written signature of a party to the transaction;
- images of transaction vouchers sent by the at least one remote facsimile machine to said central facsimile machine being formatted and processed by said central computer; and
- means incorporated in the central computer means and responsive to the processing of a transaction voucher for transmitting to at least one remote facsimile machine for reproduction thereat a credit memo or voucher including a predetermined one of said pseudo random series of alphanumeric characters.

10. A funds transfer system according to claim 9 wherein said transaction voucher includes a region containing a pseudo random set of alphanumeric characters;
- said means associated with said central computer means associated with said central facility storing a second pseudo random sequence of alphanumeric characters associated with the transacting party to whom said transaction voucher was issued;
- said processing of a transaction voucher including the comparison of said pseudo random alphanumeric characters on said voucher with a predetermined set of pseudo random alphanumeric characters in said second list to clear said transaction.

11. A method of carrying out financial transactions between parties in an electronic funds transfer system having remote facsimile machines at the sites of the parties to the transaction; and a central facility having at least one central facsimile machine for receiving images transmitted thereto from remote facsimile machines at the sites of the parties to the transaction, the central facility including a central computer having means for storing account data associated with the parties to the transaction and means for clearing financial transactions based upon the account data and the image data received on-line from at least one of said parties to a transaction, comprising the steps of:

using at least one of the remote facsimile machines, transmitting to the central facility an image of the transaction voucher having regions containing (1) information indicating whether a party to the transaction is a payor or payee, (2) information representing the amount of the transaction, (3) an account number, (4) the written signature of the party to the transaction, and (5) a pseudo random alphanumeric set of characters; and     clearing the transaction based on information contained in the voucher images received by the central facility and on account data stored at the central computer.

12. The method of claim 11 wherein the account data stored at the central computer includes a list of pseudo random alphanumeric characters assigned to an account, and including the step of deleting or voiding a set of alphanumeric characters in said list when said set has been used to clear a transaction.

13. The method of claim 11 wherein the parties to the transaction include a payor and a payee and wherein the written signature is the signature of the payor, including sending by facsimile from the central facility to the payee a credit memo or voucher of a completed transaction.

14. The method of claim 13 wherein the account data stored at the central computer includes a second set of pseudo random alphanumeric characters associated with payee account data; and     wherein said credit memo or voucher sent to said payee party includes a predetermined set of alphanumeric characters from said second list.

15. A method of carrying out financial transactions between parties in an electronic funds transfer system having at least one remote facsimile machine at the site or sites of the parties to the transaction, and a central facility having at least one central facsimile machine for receiving images transmitted thereto from at least one remote facsimile machine at the site or sites of said parties, the central facility including a central computer means having means for storing account data associated with the parties to the transaction and means for clearing financial transactions based upon the account data and the image data received on-line from at least one of said parties to a transaction, comprising the steps of:

using at least one of the remote facsimile machines at the site or sites of the parties to the transaction, transmitting to the central facility an image of a transaction voucher having regions containing (1) an account number, (2) information representing the amount of the transaction, (3) the written signature of the party to the transaction, and (4) a pseudo random alphanumeric set of characters; and     clearing the transaction based on information contained in the voucher images received by the central facility and account data stored at the central computer including a list of pseudo random alphanumeric characters assigned to at least one party to the transaction.

16. The method of claim 15 including sending by facsimile from the central facility to the other party to the transaction at a second remote facsimile machine at the site of said party a credit memo or voucher containing information indicating the amount of the transaction.

17. The method of claim 16 wherein the account data stored at the central computer includes a second list of pseudo random alphanumeric characters assigned to the second party to the transaction; and     wherein the credit memo or voucher includes a predetermined pseudo random alphanumeric set of characters from said second list.

18. The method of claim 17, including the step of deleting or voiding the set of alphanumeric characters transmitted to said second party to the transaction following transmittal thereof.

* * * * *